(12) United States Patent
Kappel et al.

(10) Patent No.: US 7,896,615 B2
(45) Date of Patent: Mar. 1, 2011

(54) WIND TURBINE BLADE WITH STRAIN SENSING MEANS, WIND TURBINE, BLOCK SENSOR UNIT AND USES HEREOF

(75) Inventors: Lars Vinther Kappel, Arthus C (DK); Andrew Hedges, Southhampton (GB)

(73) Assignee: Vestas Wind Systems A/S (DK)

( * ) Notice: Subject to any disclaimer, the term of this patent is extended or adjusted under 35 U.S.C. 154(b) by 13 days.

(21) Appl. No.: 12/544,007

(22) Filed: Aug. 19, 2009

(65) Prior Publication Data

US 2009/0311098 A1 Dec. 17, 2009

Related U.S. Application Data

(63) Continuation of application No. PCT/DK2008/000067, filed on Feb. 11, 2008.

(30) Foreign Application Priority Data

Feb. 19, 2007 (DK) ................................ 2007 00257

(51) Int. Cl.
*F03D 11/00* (2006.01)
(52) U.S. Cl. ..................................... 416/61; 416/146 R
(58) Field of Classification Search .................... 416/61
See application file for complete search history.

(56) References Cited

U.S. PATENT DOCUMENTS 5,649,035 A 7/1997 Zimmerman et al.
2008/0279499 A1* 11/2008 Mortensen et al. ............ 385/13

FOREIGN PATENT DOCUMENTS

| DE | 2011085 A1 | 2/1971 |
|---|---|---|
| DE | 10159990 A1 | 6/2003 |
| EP | 0984243 A1 | 3/2000 |
| WO | 0133179 A1 | 5/2001 |
| WO | 2005071382 A1 | 8/2005 |
| WO | 2006012827 A1 | 2/2006 |

OTHER PUBLICATIONS

Povl Brondsted, Materials for Wind Turbine Rotor Blades and Their Fatigue Behaviour, Composites and Material Mechanics, Materials Research Department Risoe National Laboratory, Coronet Regional Seminar, Apr. 28, 2005 (27 pages).
Danish Search Report, Oct. 2, 2007 (1 page).
International Search Report, Sep. 4, 2008 (3 pages).
International Preliminary Report on Patentability, Jun. 29, 2009 (8 pages).

* cited by examiner

*Primary Examiner*—Richard Edgar
(74) *Attorney, Agent, or Firm*—St. Onge Steward Johnston & Reens LLC

(57) ABSTRACT

A wind turbine blade with strain sensing functionality includes a surface structure, a block sensor unit including an optical sensor mechanism for sensing strain in the blade, and an intermediate connection plate positioned in between the optical sensor mechanism and the surface structure. The intermediate connection plate is adhesively connected to the surface structure and connected to the optical sensor mechanism. The modulus of elasticity of the intermediate connection plate is similar to or less than the modulus of elasticity of the surface structure. A wind turbine, block sensor unit and uses thereof are also contemplated.

17 Claims, 5 Drawing Sheets

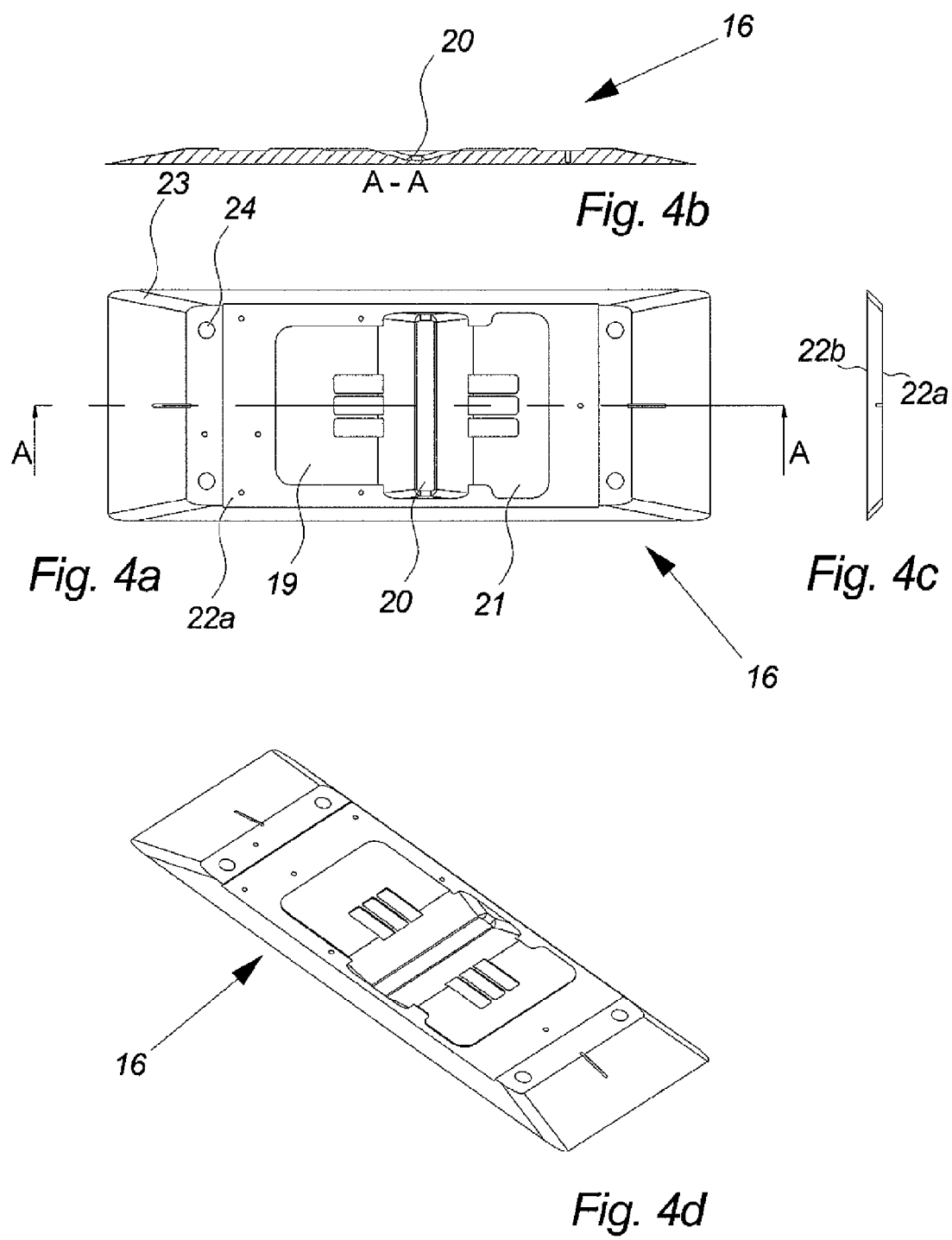

WIND TURBINE BLADE WITH STRAIN SENSING MEANS, WIND TURBINE, BLOCK SENSOR UNIT AND USES HEREOF

CROSS-REFERENCE TO RELATED APPLICATIONS

The present application is a continuation of pending International patent application PCT/DK2008/000067 filed on Feb. 11, 2008 which designates the United States and claims priority from Danish patent application PA 2007 00257 filed on Feb. 19, 2007, the content of which is incorporated herein by reference.

FIELD OF THE INVENTION

The invention relates to a wind turbine blade with strain sensing means, a wind turbine, a block sensor unit and uses hereof.

BACKGROUND OF THE INVENTION

Modern wind turbine rotor blades often being of substantial size and weight require protective measures to protect the blade against overload and fatigue failure during normal use of the wind turbine.

As a consequence wind turbine blades are equipped with different sensor means for sensing strain in the blade. Different sensor solutions have been suggested in order to achieve the necessary precision including strain gauge and optical strain sensors.

Generally the optical sensor solutions do not involving electric cabling which is considered an advantage in relation to protection against damage from lightning strikes and static electricity in the blades.

One known solution includes embedded optical sensors in the inner blade surface in order to achieve the necessary sensor precision but restricts the sensor mounting to the time of blade manufacturing and the sensors are not easily retrofitted if necessary.

Another known solution includes fixing the optical sensor as a unit in a few points on the inner blade surface e.g. with brackets. The fixating allows the sensor to function and at the same time holds it in place. The solution may be somewhat less accurate than for example the embedded sensors e.g. due to precision requirements for each number of points.

It is an object of the present invention to provide solutions for optical sensor means in wind turbines without the above-mentioned disadvantages.

SUMMARY OF THE INVENTION

The invention provides a wind turbine blade with strain sensing means, said blade comprising
  a surface structure,
  a block sensor unit including optical sensor means for sensing strain in the blade, and an intermediate connection plate positioned in between said optical sensor means and said surface structure,
  where said intermediate connection plate is adhesively connected to said surface structure and connected to said optical sensor means, and
  where the modulus of elasticity of said intermediate connection plate is similar to or less than the modulus of elasticity of said surface structure.

Hereby is achieved a wind turbine blade with an improved strain sensing and without the disadvantages of the prior art.

Especially the block sensor unit, with the intermediate connection plate as one large connection area to the inner blade surface, makes it easier to manufacture the wind turbine blade and still achieve precise strain sensing from the unit.

In an aspect of the present invention said modulus of elasticity of said intermediate connection plate is between 5 and 15 GigaPascal e.g. approx. 11 GPa. Hereby is achieved an advantageous embodiment of the invention by adapting the elasticity of the material which the intermediate connection plate is made in to the material of the surface structure which it is adhered to.

In an aspect of the present invention said intermediate connection plate is made in a glass-reinforced plastic material. Usually modern wind turbine blades are made in glass fiber reinforced epoxy resin or polyester materials e.g. introduced with carbon fibers or hybrid materials hereof with similar modulus of elasticity e.g. carbon/wood/epoxy.

In an aspect of the present invention said intermediate connection plate is made with a tapering shape at the boundaries of the plate. Hereby are stress concentrations along the boundary area reduced.

In an aspect of the present invention said intermediate connection plate is made with a plane area on one side for connection with the optical sensor means. Hereby is achieved that the strain transfer characteristics of the intermediate connection plate are more uniform.

In an aspect of the present invention said intermediate connection plate is made with an indented area on one side for connection with the optical sensor means. Hereby is the intermediate connection plate adapted to the shape of the optical sensor means.

In an aspect of the present invention said intermediate connection plate is adhered to the blade surface structure with adhesive means comprising a modulus of elasticity similar to or less than the modulus of elasticity of said of said intermediate connection plate e.g. two-component epoxy resin. Hereby it is ensured that the rigidity is sufficient to transfer the strain from the blade to the intermediate connection plate and the optical sensor means and still maintaining enough flexibility to ensure that the adhesive connection is not ruptured.

In a further aspect of the present invention said optical sensor means includes light emitting means and light receiving means which are displaceable in relation to each other.

The invention further relates to a wind turbine comprising at least two wind turbine blades.

The invention further relates to a block sensor unit for mounting in a wind turbine blade, said unit comprising
  an intermediate connection plate,
  optical sensor means for sensing strain in the wind turbine blade, and preferably a protective cover protecting the sensor means,
  where said intermediate connection plate on one side includes an area for connection with a blade surface structure and on the other side includes an area for connection with the optical sensor means, and
  where the modulus of elasticity of said intermediate connection plate is similar to or less than the modulus of elasticity of the surface structure.

Hereby is it possible to create an easily mounted block sensor unit with a high degree of precision. Further, the block sensor unit sufficiently protects the very delicate optical sensor means during mounting and normal use.

In an aspect of the present invention said unit, or at least said intermediate connection plate, optical sensor means for sensing strain in the wind turbine blade, and protective cover protecting the sensor means, is made in electrically non-conductive material. Hereby is ensured a high level of lightning protection and especially against flashovers between components within the wind turbine blade and thus establishing uncontrolled and unexpected paths for the lightning current.

In another aspect of the present invention said unit and preferably the intermediate connection plate comprises a number of through-going screw holes. Hereby it is ensured that the unit stays in place during the curing period of the adhesive means by screwing a few screws into the surface structure. The curing period may be many hours or even days when using two-component epoxy resin and the relevant surface of the wind turbine blade may be vertically positioned during the connection process.

In a further aspect of the present invention said intermediate connection plate comprises one or more centre line marks. Hereby it is possible to align the plate during attachment to the blade.

In an even further aspect of the present invention said intermediate connection plate comprises at least two sets of attachment platforms, each set capable of holding the attachment plates of the optical sensor means. Hereby it is easy to retrofit a new optical sensing means by breaking off the old one including the two attachment plates or platforms in a set. The new optical sensing means is attached to two attachment platforms in a remaining set.

In an even further aspect of the present invention said intermediate connection plate and optical sensor means are connected in a strain transferring manner e.g. by adhering sensor attachment plates to plate attachment platforms.

The invention even further relates to uses of a block sensor unit mounted in a wind turbine blade for sensing flap-wise bending strain in the blade or as unit for supplementary mounting in a wind turbine blade. The possibility of supplementary mounting of block sensor units in existing wind turbine blades is especially advantageously as an upgrade or improvement of the strain sensing in the blades e.g. due to flap-wise bending strain.

BRIEF DESCRIPTION OF THE DRAWINGS

The invention will be described in the following with reference to the figures in which FIGS. 4a to 4d illustrate the intermediate connection plate according to the invention seen from difference positions and in perspective view.

DETAILED DESCRIPTION OF THE INVENTION

Figure 1:
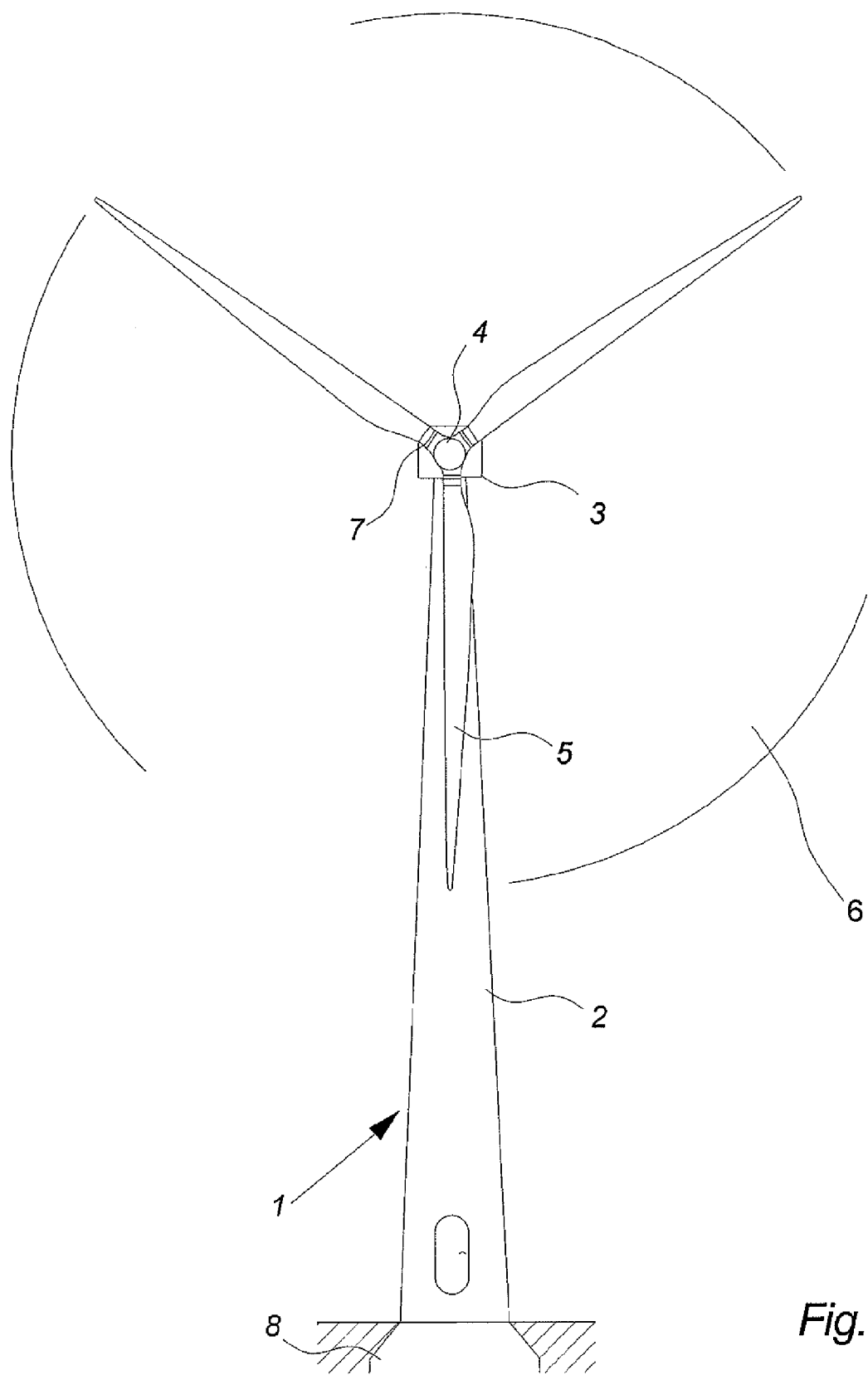
FIG. 1 illustrates a front view of a large modern wind turbine.

FIG. 1 illustrates a front view of a modern wind turbine 1 with a tower 2 positioned on a foundation 8. A wind turbine nacelle 3 and hub 4 is positioned on top of the tower.

The wind turbine rotor 6, comprising at least one blade such as two or three wind turbine blades 5 as illustrated, is connected to the wind hub 4 through pitch mechanisms 7. Each pitch mechanism includes a blade bearing and pitch actuating means which allows the blade to pitch.

Figure 2:
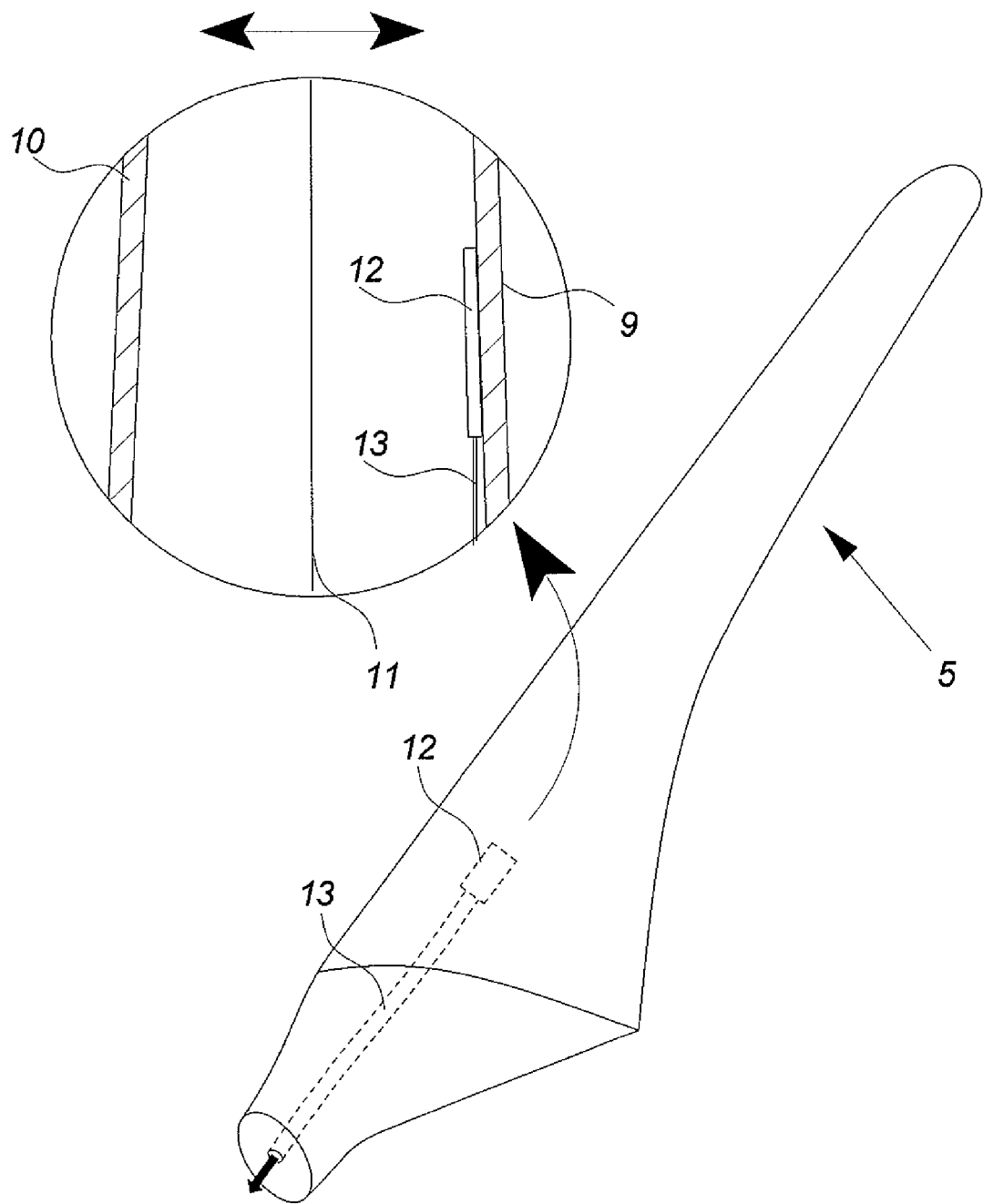
FIG. 2 illustrates schematically the positioning of optical sensor means on the inner surface of a wind turbine blade.

FIG. 2 illustrates schematically the position of an optical sensor 12 inside a wind turbine blade.

The enlarged figure section illustrates that the optical sensor is positioned in proximity of the blade root and on a first inner surface structure 9 of the blade. The sensor is also positioned in a distance from the blade leading and trailing edges 11 e.g. in the center between them in order to sense flap-wise bending strain.

The sensor is connected to external receiver means through an optical fiber cable 13 such as a control and monitoring system in the wind turbine or in a remote control center for wind parks or utility grids.

Figure 3:
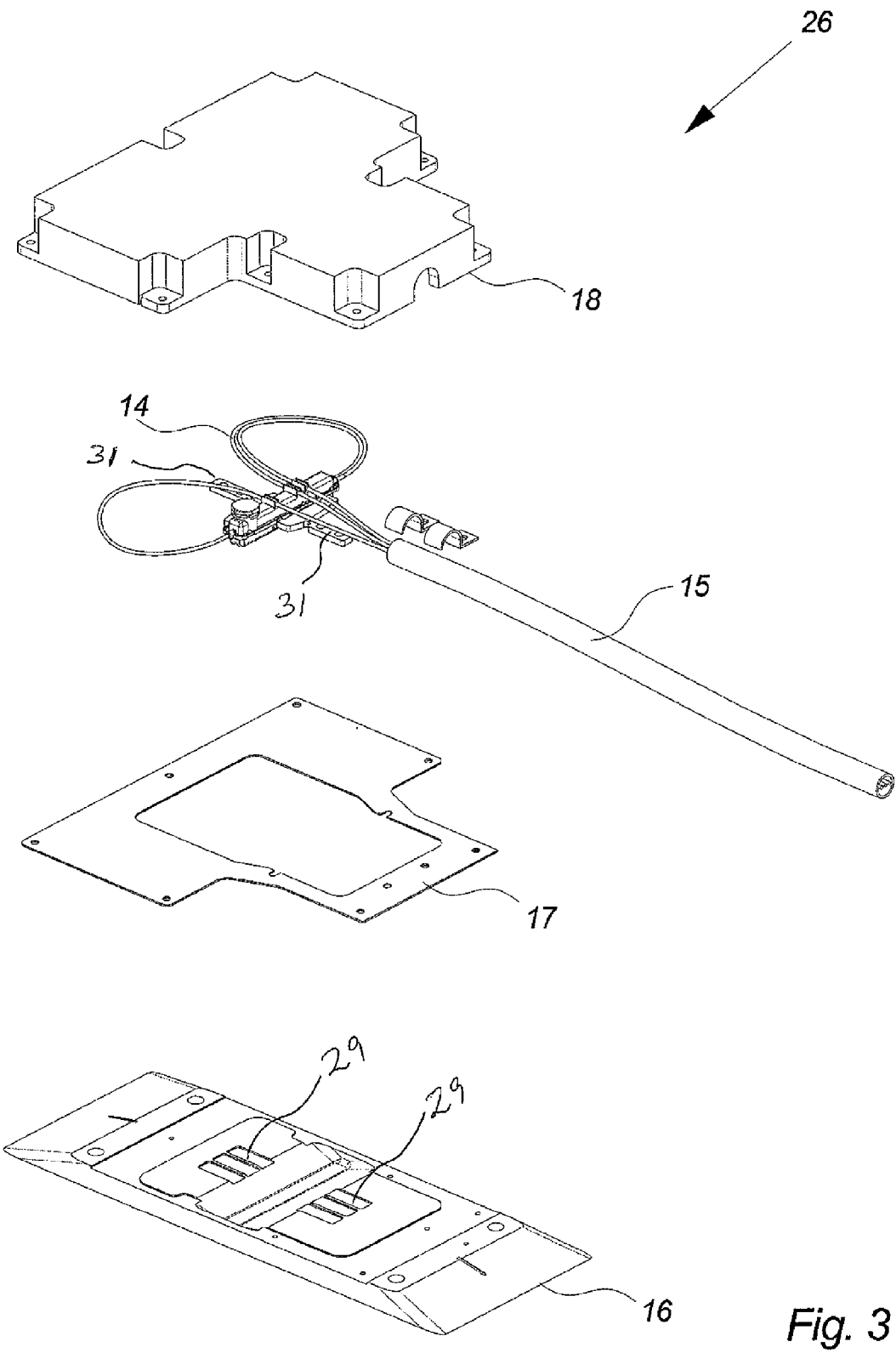
FIG. 3 illustrates in an exploded view the different elements of an optical sensor in a preferred embodiment according to the invention.

FIG. 3 illustrates in an exploded view the different elements of an optical sensor in a preferred embodiment according to the invention.

The different elements establish a block sensor unit 26 which includes optical sensor means 14, an optical fiber cable 15, an intermediate connection plate 16, a bottom cover plate 17 and a protective cover 18. The intermediate connection plate, the bottom plate and the protective cover establish a housing which fully encloses the sensor means including loops which extend beyond the sides of the intermediate connection plate 16.

The illustrated sensor means comprises three optical fibers which form three loops wherein each loop fiber enters into a connection frame of the optical sensor means 14. A single loop fiber enters into one end of the frame and the two other loop fibers enters in the opposite end of the frame where the two fibers are horizontally aligned and positioned close together. From the lower part of each side of the frame extend an attachment plate in opposite direction.

The single fiber end faces the ends of the two opposite fibers in a transition zone. The sensor means 14 includes light emitting means (the single fiber end) and light receiving means (the ends of the two opposite fibers).

The connection frame is divided into two displaceable sections comprising either the light emitting means or the light receiving means. The sections are displaceable in the transition zone in relation to each other by forces from the sides such as strain transferred from the attachment plates 31.

The light emitting means is displaced in relation to the two fibre ends of the light receiving means when strain pulls and/or drags in the attachment plates 31. Hereby will the amount of light which each end of the two fibers receives change i.e. no strain change: one ratio of light amount—strain change: one end increases and one end decreases in light amount.

The attachment plates of the optical sensor means 14 are adhesively connected to a first and second attachment area of the intermediate connection plate 16 at one of three sets of attachment platforms 29 for the attachment plates 31 of the optical sensor means 14.

The plates or platforms may for example in an embodiment of the invention only be attached to the sensor or intermediate connection plate with an area of reduced material use or as a form of "flaps".

The optical sensor means 14 continues in an optical cable 15 comprising a protective cable jacket.

In a preferred embodiment elements of the block sensor unit 26 may comprise the following data:

| Intermediate connection plate 16 | |
|---|---|
| material | GRP |
| length | 250 to 500 millimeters |

-continued

| | |
|---|---|
| width | 100 to 200 millimeters |
| thickenss | less than 15 millimeters |
| modulus of elasticity | approx. 11 GigaPascal |
| | The adhesive means 27 |
| material | two component epoxy resin |
| curing time | 12 hours at 20° C. (in order to be ready for use) |

Figure 5A:
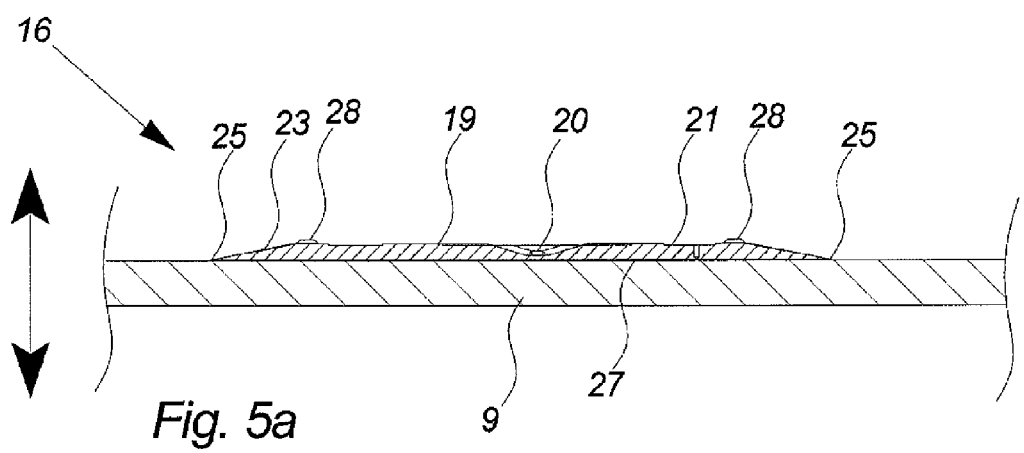
FIGS. 5a and 5b illustrate the intermediate connection plate according to the invention positioned on the inner surface of a wind turbine blade.
Figure 5B:
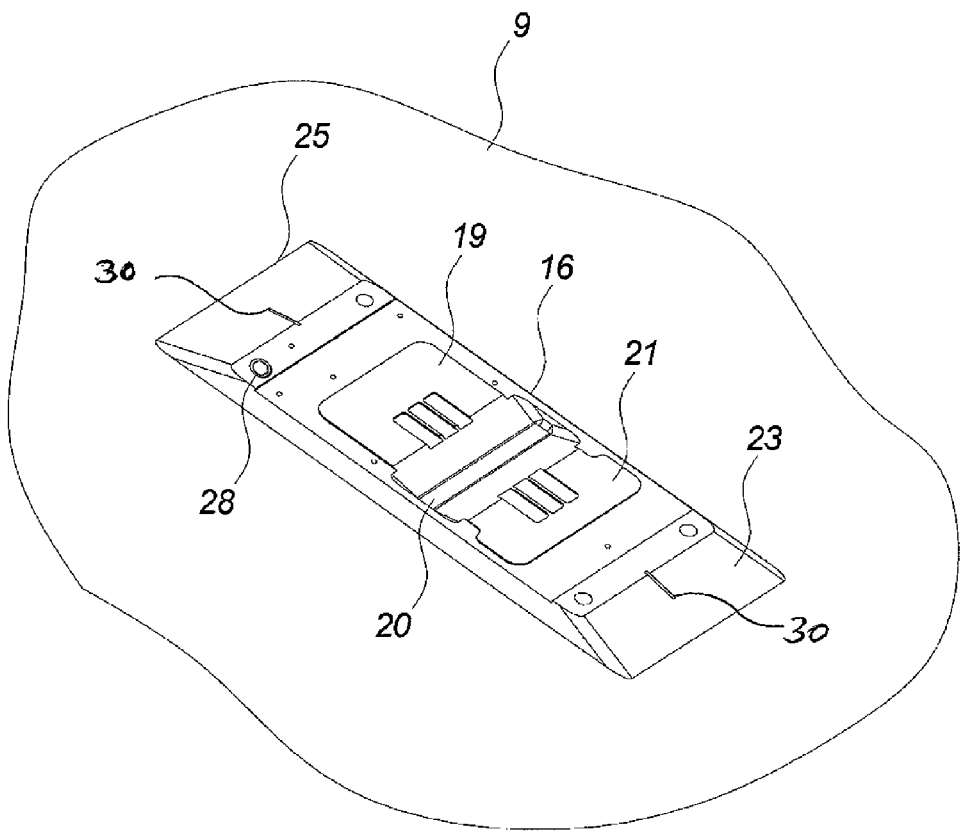

FIGS. 5a and 5b illustrate a preferred embodiment of the intermediate connection plate 16 according to the invention. The plate is in both figures illustrated as positioned on the inner surface 9 of a wind turbine blade.

FIG. 5a illustrates a cross sectional side view through the intermediate connection plate 16 and the blade at the inner surface 9. The cross view especially illustrates the shape and position of the first and second attachment areas 19, 21 for the optical sensor means. The first and second attachment areas 19, 21 are positioned on opposite side of the indentation area 20 in the intermediate connection plate 16. Further, the figure indicates the adhesive means 27 adhering the intermediate connection plate 16 to the inner blade surface 9 and the mounting screws 28 holding the plate in place during the curing process.

Even further, the double arrow schematically illustrates the flap-wise bending movements of the blade which is transferred to the block sensor unit as strain pulls and/or drags in the attachment plates of the optical sensor means.

FIG. 5b illustrates the intermediate connection plate 16 according to the invention in a perspective view and positioned on a section of the inner blade surface 9.

The invention described has been exemplified above with reference to specific examples of intermediate connection plate and optical sensor means. However, it should be understood that the invention is not limited to the particular examples but may be designed and altered in a multitude of varieties within the scope of the invention as specified in the claims e.g. with different choices in plate material or different types of optical sensors e.g. Bragg sensors.

FIGS. 4a to 4d illustrate the intermediate connection plate 16 according to the invention seen from difference positions and in perspective view.

FIG. 4a illustrates the intermediate connection plate 16 seen from above. The present embodiment of the plate is a four-sided plate with a center area for the optical sensor means and an area with a tapering shape toward the boundaries of the plate. The center area includes a first and second attachment area 19, 21 for the optical sensor means and an indentation area 20 for the connection frame of the optical sensor means. Further, the center area includes through going mounting holes 24 in each corner. The holes and a number of screws screwed into the inner blade surface may be used in order to keep the plate in place after being adhered to the inner blade surface with adhesive means.

FIG. 4b illustrates a cross sectional side view A-A through the intermediate connection plate 16. The figure further illustrates the tapering shape toward the boundaries of the plate e.g. establishing a triangular shape and hereby giving the intermediate connection plate a frustum of a pyramid shape.

FIG. 4c illustrates the intermediate connection plate 16 according to the invention seen from the front.

The figure especially illustrates the two surface sides of the intermediate connection plate 16: One surface side 22b which includes an area for connection with a blade surface structure 9 and the other side 22a which includes an area for connection with the optical sensor means 14.

FIG. 4d illustrates the intermediate connection plate 16 according to the invention in a perspective view.

What is claimed is:

1. A wind turbine blade with strain sensing means, said blade comprising
a surface structure,
a block sensor unit including
optical sensor means for sensing strain in the blade, and
an intermediate connection plate positioned in between said optical sensor means and said surface structure,
where said intermediate connection plate is adhesively connected to said surface structure and connected to said optical sensor means, and
where a modulus of elasticity of said intermediate connection plate is similar to or less than a modulus of elasticity of said surface structure.

2. The wind turbine blade according to claim 1 wherein said modulus of elasticity of said intermediate connection plate is between 5 and 15 GigaPascal.

3. The wind turbine blade according to claim 1 wherein said modulus of elasticity for said intermediate connection plate is substantially the same as the blade surface structure by being made of a blade material.

4. The wind turbine blade according to claim 1 wherein said intermediate connection plate is made with a tapering shape at boundaries of the plate.

5. The wind turbine blade according to claim 1 wherein said intermediate connection plate is made with a plane area on one side for connection with the optical sensor means.

6. The wind turbine blade according to claim 1 wherein said intermediate connection plate is made with an indented area on one side for connection with the optical sensor means.

7. The wind turbine blade according to claim 1 wherein said intermediate connection plate is adhered to the blade surface structure with adhesive means comprising a modulus of elasticity similar to or less than the modulus of elasticity of said of said intermediate connection plate.

8. The wind turbine blade according to claim 1 wherein said optical sensor means includes light emitting means and light receiving means which in a transition zone are displaceable in relation to each other.

9. A wind turbine comprising at least two wind turbine blades according to claim 1.

10. A block sensor unit for mounting in a wind turbine blade, said unit comprising
an intermediate connection plate,
optical sensor means for sensing strain in the wind turbine blade, and a protective cover protecting the optical sensor means,
wherein said intermediate connection plate on one side includes an area for connection with a blade surface structure and on another side includes an area for connection with the optical sensor means, and
wherein a modulus of elasticity of said intermediate connection plate is similar to or less than a modulus of elasticity of the surface structure.

11. The block sensor unit according to claim 10 wherein at least said intermediate connection plate, optical sensor means for sensing strain in the wind turbine blade, and the protective cover protecting the sensor means, is made of electrically non-conductive material.

12. The block sensor unit according to claim 10 wherein said unit comprises a number of through-going screw holes.

13. The block sensor unit according to claim 10 wherein said intermediate connection plate comprises one or more centre line marks.

14. The block sensor unit according to claim 10 wherein said intermediate connection plate comprises at least two sets of attachment platforms, each set capable of holding attachment plates of the optical sensor means.

15. The block sensor unit according to claim 10 wherein said intermediate connection plate and optical sensor means are connected in a strain transferring manner.

16. Use of a block sensor unit according to claim 10 mounted in a wind turbine blade for sensing flap-wise bending strain in the blade.

17. Use of a block sensor unit according to claim 10 as a unit for supplementary mounting in a wind turbine blade.

* * * * *